Patented Feb. 17, 1942

2,273,030

UNITED STATES PATENT OFFICE 2,273,030

PROCESS OF PREPARING PHENOLS

Wilhelm Fitzky and Herbert Kracker, Frankfort-on-the-Main, Germany, assignors, by mesne assignments, to General Aniline & Film Corporation, New York, N. Y., a corporation of Delaware No Drawing. Application June 8, 1939, Serial No. 278,074. In Germany June 14, 1938

9 Claims. (Cl. 260—621)

The present invention relates to a process of preparing phenols.

We have found that acid substances which promote hydration are capable, in the presence of water, of transforming aniline into phenol. These catalysts promoting hydration are such substances as are known to promote the addition of water to a double linkage. Such catalysts are especially compounds showing a strongly acid reaction in an aqueous medium, for instance strong mineral acids such as phosphoric acid, sulfuric acid, hydrogen chloride and hydrogen bromide; strong complex acids such as phosphotungstic acid and phosphomolybdic acid; strong organic acids such as benzene sulfonic acid, toluene sulfonic acid and naphthalene sulfonic acids and also inorganic compounds such as zinc chloride and boron trifluoride. In industrial scale operation phosphoric acid has the best effect.

It seems that the action of these acid substances is not only catalytic as in some cases they do not remain unchanged. Phosphoric acid, for instance, is partly transformed into ammonium phosphate by the action of the ammonia produced. Moreover the effect is dissimilar to that usually associated with a catalyst in that the efficacy of the acid substance applied is in general better when it is used in large quantities and at a high concentration. Preferably there is used at least 1 mol of water and at least 1 mol of the acid substance calculated upon 1 mol of aniline, but considerably larger quantities of the acid substance and water may also be applied, for instance 3 mols of each calculated upon 1 mol of aniline. An exact upper limit does not exist, since even very large quantities of acid have no detrimental action and are only disadvantageous for the economical aspect of the process. The concentration of the acid substance in the water may be, for instance, 80 per cent; especially favorable concentrations are those of about 10 per cent to about 20 per cent, but the process may also be carried out with a lower concentration, for instance of 5 per cent. A lower concentration has merely the effect of prolonging the process.

In order to counteract the volatility of the compounds used at high temperatures, the reaction is preferably conducted under raised pressure. A pressure of about 20 to about 300 atmospheres may be applied. The optimum temperatures are at least at 200° C. The temperatures may be very high without an undesired decomposition being observed. For instance, it is possible to work even at 400° C.

Besides phenols, there are obtained products of the reaction of the hydroxy-compounds formed with the base used, for instance diphenylamine when aniline is used.

The moment at which the reaction is as complete as possible may readily be ascertained in each case. For this purpose a test portion of the reaction mixture may be examined in order to estimate whether the main quantity of the aniline has been consumed. This test may be performed by diazotization.

In order to complete the reaction an extracting agent for phenol may be added which separates the product of the hydrolysis from the aqueous medium and thus favors the formation of the said product. Such extracting agents must be stable under the conditions of the reaction. There may be used difficultly volatile organic compounds of high-boiling point, especially diphenylamine.

The industrial importance of the process resides mainly in the possibility of transforming aniline nearly quantitatively into valuable products while the nitrogen eliminated is recovered in the form of ammonium salts.

Besides aniline the homologues thereof such as ortho-, meta- and para-toluidine as well as the xylidines may be transformed in like manner into the corresponding phenols.

The following examples serve ot illustrate the invention, but they are not intended to limit it thereto:

(1) 372 grams of aniline are heated for 20 hours to 280° C. to 290° C. in an autoclave together with 1500 grams of phosphoric acid of 85 per cent strength and 900 grams of water. The desired product separates in large part from the aqueous solution of ammonium phosphate and phosphoric acid. For the quantitative recovery of the product the solution is extracted with ether and the extract is united with the oil which has separated spontaneously and dried. By a fractional distillation 208 grams of phenol, i. e. 55 per cent of the theory, and 85 grams of diphenylamine, i. e. 25 per cent of the theory, are obtained. The aqueous solution of ammonium phosphate still contains 26 grams of aniline, i. e. 7 per cent of the theory.

(2) 279 grams of aniline are heated for 25 hours to 280° C. to 290° C. together with 1150 grams of phosphoric acid of 85 per cent strength and 1200 grams of water. The desired product is extracted with benzene and the benzene solution is freed from acid and fractionally distilled. There are obtained 217 grams of phenol, i. e. 77 per cent of the theory and 20 grams of diphenylamine, i. e. 8 per cent of the theory; 28 grams of aniline, i. e. 10 per cent of the theory, remain unaltered in the form of phosphate.

(3) 279 grams of aniline are mixed with 100 grams of water and 200 grams of zinc chloride and the solid addition product obtained is heated for 36 hours at 280° C. With the aid of steam there are obtained from the mass 120 grams of phenol and 92 grams of diphenylamine.

(4) 279 grams of aniline are heated for 30 hours at 285° C. in an autoclave together with 1300 grams of phosphoric acid of 65 per cent strength and 1200 grams of water with an addition of 200 grams of naphthalene. The product is worked up as described in Example 1. There are obtained 66 per cent of the theory of phenol, 20 per cent of the theory of diphenylamine and only 2.5 per cent of unaltered aniline.

(5) 279 grams of aniline are heated for 36 hours at 280° C. together with 1500 grams of an aqueous solution of 60 per cent strength of boron trifluoride. The phenol is then distilled with the aid of steam. In the residue the aniline crystallizes in the form of a salt.

In a manner analogous to that described in the foregoing examples the homologues of aniline may be transformed into the corresponding hydroxyl compounds.

(6) 186 grams of aniline are heated for 40 hours at 300° C. together with 2400 grams of phosphoric acid of 26 per cent strength. The product is worked up as described in Example 1. There are obtained 160 grams of phenol and 9 grams of diphenylamine besides a small portion of a base capable of being diazotized.

(7) 214 grams of meta-toluidine are heated for 40 hours at 280° C. together with 950 grams of phosphoric acid of specific gravity of 1.5 and 530 grams of water. By fractional distillation of the crude product there is obtained the meta-cresol boiling at 190° C.

(8) 93 grams of aniline are heated for 30 hours at 290° C. to 300° C. in an acid-proof autoclave together with 400 grams of hydrochloric acid of 25 per cent strength. After the reaction is complete the oil which has separated is removed. For the quantitative recovery of the product the aqueous liquid is extracted with ether. The etheral residue is united with the oil (about 70 grams) and treated with caustic soda solution, whereby there are obtained phenol in the form of its soluble sodium salt and a small quantity of insoluble diphenylamine.

(9) 93 grams of aniline are heated for 30 hours at 250° C. in an acid-proof autoclave together with a solution of 420 grams of benzene sulfonic acid in 580 grams of water. The phenol formed is distilled from the reaction product with the aid of steam. About 50 grams of phenol are obtained.

(10) 235 grams of aniline are heated for 50 hours at 280° C. to 290° C. in an autoclave provided with a stirrer together with 370 grams of phosphoric acid of 67 per cent strength and 860 grams of water with an addition of 300 grams of diphenylamine serving as an extracting agent. After the mixture has been cooled to about 100° C. further 200 grams of phosphoric acid of 67 per cent strength are added, the whole is well mixed and the mixture of phenol and diphenylamine is obtained by separation and extraction and, as described in Example 1, is subjected to distillation. There are obtained 171 grams of phenol, 34 grams of newly formed diphenylamine. The aqueous ammonium phosphate solution still contains 16 grams of aniline.

We claim:

1. The process which comprises heating an aromatic amine of the group consisting of aniline and its homologues at temperatures of at least 200° C. under superatmospheric pressure in the presence of water and of an acid catalyst known to promote hydration.

2. The process which comprises heating 1 mol of an aromatic amine of the group consisting of aniline and its homologues at temperatures of at least 200° C. under superatmospheric pressure in the presence of at least 1 mol of water and at least 1 mol of a compound showing a strongly acid reaction in an aqueous medium.

3. The process which comprises heating an aromatic amine of the group consisting of aniline and its homologues at temperatures of at least 200° C. under superatmospheric pressure in the presence of water, of an acid catalyst known to promote hydration and of an organic compound capable of dissolving phenol and stable under the conditions of the reaction.

4. The process which comprises heating an aromatic amine of the group consisting of aniline and its homologues at temperatures of at least 200° C. under superatmospheric pressure in the presence of water and of phosphoric acid.

5. The process which comprises heating 1 mol of an aromatic amine of the group consisting of aniline and its homologues at temperatures of at least 200° C. under superatmospheric pressure in the presence of at least 1 mol of water and of at least 1 mol of phosphoric acid.

6. The process which comprises heating an aromatic amine of the group consisting of aniline and its homologues at temperatures of at least 200° C. under superatmospheric pressure in the presence of water, of phosphoric acid and of an organic compound capable of dissolving phenol and stable under the conditions of the reaction.

7. The process which comprises heating 235 parts of aniline with 860 parts of water, 370 parts of aqueous phosphoric acid of 67 per cent strength and 300 parts of diphenylamine at a temperature of 280° C. to 290° C.

8. The process which comprises heating 186 parts of aniline with 2400 parts of aqueous phosphoric acid of 26 per cent strength at a temperature of 300° C.

9. The process which comprises heating 214 parts of meta-toluidine with 530 parts of water and 950 parts of aqueous phosphoric acid (specific gravity 1.5) at a temperature of 280° C.

WILHELM FITZKY.
HERBERT KRACKER.